United States Patent Office 3,140,226
Patented July 7, 1964

3,140,226
MICROORGANISM TOXIC ALPHA-CHLORO-BETA-CYANOETHYLARYL SULFONES
John A. Stephens and Gail H. Birum, Dayton, Ohio, assignors to Monsanto Company, a corporation of Delaware
No Drawing. Filed June 13, 1961, Ser. No. 116,667
19 Claims. (Cl. 167—30)

The invention relates to new compounds which are α-chloro-β-cyanoethyl aryl sulfones, biological toxicant compositions and methods of killing or suppressing the growth of microorganisms.

In copending application Serial No. 796,740, filed March 3, 1959, are disclosed new arylsulfonyl haloalkanenitriles which are excellent fungicides, bacteriostats and fungistats. These compounds are α-chloro-β-(arylsulfonyl)propionitriles, β-chloro-α-(arylsulfonyl)propionitriles or mixtures thereof. A number of ways of making these compounds are set forth on page 6 and the experimental examples of application Serial No. 796,740. Now according to the present invention a method has been found for producing a new class of compounds which are α-chloro-β-cyanoethyl arylsulfones or β-chloro-β-(arylsulfonyl)propionitriles. These new compounds of the present invention differ in structure from the compounds of copending application Serial No. 796,740 in having a chlorine atom on the same carbon atom to which the arylsulfonyl group is attached, as compared to the compounds of copending application Serial No. 796,740 which have the chlorine atom on an adjacent carbon atom. Furthermore, very surprisingly, it has been found that the new compounds of the present invention in addition to being excellent fungicides are of the order of 100 times as effective as bacteriostats and 10 times as effective as fungistats as the compounds of copending application Serial No. 796,740. Thus by the present invention a new class of compounds has been provided which have outstanding bacteriostatic and fungistatic properties.

It is an object of this invention to provide new compounds.

It is another object of this invention to provide new and effective biological toxicant compositions.

It is another object of this invention to provide a new method of inhibiting the growth of undesired microorganisms.

It is another object of this invention to provide a new method of treating soil to kill or inhibit the growth of fungi.

It is another object of this invention to provide a new method of treating soil to prevent substantial fungal damage to the germination of seeds and the growth of plants in the soil.

These and other objects of the invention will become apparent as the detailed description of the invention proceeds.

The novel compounds of the present invention are α-chloro-β-cyanoethyl arylsulfones of the formula

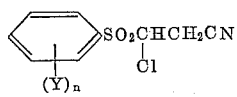

wherein Y is a halogen atom, i.e. bromine, chlorine, iodine or fluorine, preferably chlorine, or an alkyl radical having from 1 to 6 carbon atoms, preferably a methyl radical, and $n$ is an integer from 0 to 5

The following is an illustrative but not meant to be limiting listing of specific compounds of the invention: α-chloro-β-cyanoethyl phenyl sulfone, α-chloro-β-cyanoethyl p-tolylsulfone, α-chloro-β-cyanoethyl m-tolyl sulfone, α-chloro-β-cyanoethyl o-tolyl sulfone, α-chloro-β-cyanoethyl 2,3-xylyl sulfone, α-chloro-β-cyanoethyl 2,4-xylyl sulfone, α-chloro-β-cyanoethyl 2,5-xylyl sulfone, α-chloro-β-cyanoethyl 2,6-xylyl sulfone, α-chloro-β-cyanoethyl p-ethylphenyl sulfone, α-chloro-β-cyanoethyl o-isopropylphenyl sulfone, α-chloro-β-cyanoethyl 3-n-butylphenyl sulfone, α-chloro-β-cyanoethyl 4-t-butylphenyl sulfone, α-chloro-β-cyanoethyl 4-n-pentylphenyl sulfone, α-chloro-β-cyanoethyl 2-hexylphenyl sulfone, α-chloro-β-cyanoethyl o-methyl-p-ethylphenyl sulfone, α-chloro-β-cyanoethyl p-t-butyl-o-tolyl sulfone, α-chloro-β-cyanoethyl pentamethyl phenyl sulfone, α-chloro-β-cyanoethyl p-chlorophenyl sulfone, α-chloro-β-cyanoethyl m-chlorophenyl sulfone, α-chloro-β-cyanoethyl o-chlorophenyl sulfone, α-chloro-β-cyanoethyl 2,3-dichlorophenyl sulfone, α-chloro-β-cyanoethyl 2,4-dichlorophenyl sulfone, α-chloro-β-cyanoethyl 2,5-dichlorophenyl sulfone, α-chloro-β-cyanoethyl 2,6-dichlorophenyl sulfone, α-chloro-β-cyanoethyl 2,3,4-trichlorophenyl sulfone, α-chloro-β-cyanoethyl 2,3,5-trichlorophenyl sulfone, α-chloro-β-cyanoethyl 2,3,6-trichlorophenyl sulfone, α-chloro-β-cyanoethyl 2,4,5-trichlorophenyl sulfone, α-chloro-β-cyanoethyl 2,4,5-trichlorophenyl sulfone, α-chloro-β-cyanoethyl 2,4,6-trichlorophenyl sulfone, α-chloro-β-cyanoethyl 2,3,4,5-tetrachlorophenyl sulfone, α-chloro-β-cyanoethyl 2,3,4,6-tetrachlorophenyl sulfone, α-chloro-β-cyanoethyl 2,3,5,6-tetrachlorophenyl sulfone, α-chloro-β-cyanoethyl pentachlorophenyl sulfone, α-chloro-β-cyanoethyl p-bromophenyl sulfone, α-chloro-β-cyanoethyl o-iodophenyl sulfone, α-chloro-β-cyanoethyl m-fluorophenyl sulfone, α-chloro-β-cyanoethyl 2-chloro-4-bromophenyl sulfone, α-chloro-β-cyanoethyl 2-methyl-4-chlorophenyl sulfone, etc.

There are at least several methods of making the compounds of the present invention. In one method a thiophenol is reacted with acrylonitrile to form a β-(arylthio)-propionitrile, which is chlorinated to add a chlorine atom on the carbon atom to which the arylthio radical is attached, and the chlorinated compound is oxidized to the sulfone. By another method a metal salt, e.g. an alkali metal salt, of an arylthiol is reacted with β-chloropropionitrile to form a β-(arylthio)propionitrile, which is treated in the same manner as the same intermediate product of the first method to give the desired sulfone of the present invention. Also it is possible that the chlorination and oxidizing steps could be reversed or carried on simultaneously, and other methods for making the novel sulfones may be obvious to those skilled in the art in view of the teachings of the present invention. Typical reaction conditions and reactant proportions are set forth in the examples, but it should be understood that these are merely illustrative of suitable conditions and proportions of reactants and not limiting.

The invention will be more clearly understood from the following detailed description of specific examples thereof:

Example 1

This example illustrates the preparation of α-chloro-β-cyanoethyl phenyl sulfone. To a reaction vessel provided with a stirrer and a cooling bath were added 122 g. of benzenethiol and 2 drops of "Triton B" (tetramethyl-ammonium hydroxide). The reaction vessel and contents were cooled to 16° C. and the addition of 74.1 g. of acrylonitrile was begun with cooling to hold the temperature of the reaction between 20° and 30° C. One hour and forty-five minutes were required to complete the addition of the acrylonitrile and the reaction was continued for an additional 1 hour and 15 minutes. The reaction mixture was a pale green solution. It was allowed to stand overnight at room temperature. The next morning the reaction mixture was brownish in color and was dissolved in 100 ml. of ether. The ether solution was subjected to multiple washings, first with 50 ml. of 5% sodium hydroxide, second with 50 ml. of saturated sodium chloride, next with 50 ml. of 5% hydrochloric acid and finally with 50 ml. of saturated sodium chloride. The ether solution was then dried by filtering through anhydrous magnesium sulfate and the ether was removed by evaporation at water pump vacuum (about 15 mm. of Hg absolute pressure) to 50° C. pot temperature. Next the crude residue product was distilled at high vacuum to give a 98.6% yield of β-cyanoethyl phenyl sulfide, B.P. 105–106° C./0.3 mm. of Hg. Weight of the purified product recovered was 151.1 g. having a refractive index of $n_D^{26}$ of 1.5729.

To a reaction vessel equipped with a stirrer was added 49 g. of the β-cyanoethyl phenyl sulfide in 50 ml. of dichloromethane. Then very slowly over a period of 6 hours and 15 minutes at room temperature was added 42.6 g. of sulfuryl chloride ($SO_2Cl_2$) in 50 ml. of dichloromethane. Stirring of the reaction mixture was continued for an additional hour after the completion of the addition of the sulfuryl chloride and the reaction mixture was allowed to stand overnight protected from the atmosphere by a drying tube. The next day the orange colored reaction mixture was stripped of solvent and any unreacted sulfuryl chloride under reduced pressure to a pot temperature of 26° C./30 mm. of Hg. The residue product was a clear orange, somewhat viscous oil weighting 53.0 g. (90% of theory) and having a refractive index of $n_D^{26}$ 1.5922. This residue product is α-chloro-β-cyanoethyl phenyl sulfide. The refractive index of this sulfide intermediate product is compared with the refractive index of α-chloro-β-(phenylthio)propionitrile which has a refractive index of $n_D^{25}$ 1.5762.

The last step in the preparation of the desired product is the oxidation of the sulfide to the sulfone. To a reaction flask was added 12.5 g. of chromic oxide ($CrO_3$) in 75 ml. of glacial acetic acid. A sample of 9.9 g. of α-chloro-β-cyanoethyl phenyl sulfide prepared as described in the previous paragraph and dissolved in 32 ml. of glacial acetic acid was added over a period of 2½ hours with stirring and at room temperature to the chromic acid in the reaction flask. Stirring of the reactants was continued overnight at room temperature with the reaction flask being isolated from the atmosphere through a drying tube. The next day the reaction mixture was warmed to 65° C. in a hot water bath, then poured onto 300 g. of ice. The mixture was stirred and a small amount of oil separated. Over a period of about ½ hour 50 g. of solid sodium carbonate was added to neutralize the mixture. Ice was added as necessary to keep the temperature down. An aqueous layer was decanted from a tan, gummy crude product. This crude product was washed with ice water and it slowly solidified. The solidified crude product was separated from the ice water by filtration. The filtered product which was a green solid was washed with water, then with a few ml. of absolute alcohol. The product was dried and weighed 3.5 g. It sinters at 62° C. and melts at 66–70° C. A sample of the product was recrystallized from absolute ethanol to yield a white powder which sinters at 60° C. and melts at 65–68° C. The white powder product was again crystallized from absolute ethanol to give a white powder product sintering at 82° C. and melting at 88–91° C. An elemental analysis of this product yielded the following results:

| Percent | Found | Calcd. for $C_9H_8ClNO_2S$ |
|---|---|---|
| C | 49.4 | 47.1 |
| H | 3.9 | 3.5 |
| N | 6.2 | 6.1 |

This is the desired product of the invention namely α-chloro-β-cyanoethyl phenyl sulfone. A mixed melting point was made with this product of the invention and α-chloro-β-(phenylsulfonyl)propionitrile having a melting point of 105–196° C. and the mixture sintered at 69° C. and melted at 71–76° C.

A sample of the product of the invention was treated with triethyl amine in ether and allowed to stand overnight. In the morning a brown solid precipitate was separated by filtration. The ether solution was then washed with water, 5% HCl and again with water. Then the ether solution was dried over anhydrous magnesium sulfate. When the ether was removed by distillation under vacuum a gummy tan residue resulted. Crystallization of this residue product from absolute ethanol gave a tan powder which sintered at 85° C. and melted at 95–100° C. This dehydrohalogenation product is β-(phenylsulfonyl)acrylonitrile which in pure form has a melting point of about 102° C.

When the same molar amount of toluenethiol or xylenethiol is substituted for the thiophenol in Example 1, the resultant product is α-chloro-β-cyanoethyl tolyl sulfone or α-chloro-β-cyanoethyl xylyl sulfone, respectively.

Example 2

This example teaches the preparation of α-chloro-β-cyanoethyl p-chlorophenyl sulfone. To a reaction vessel is added 144.5 g. (1 mol) of p-chlorobenzenethiol and 2 drops of "Triton B." The reaction flask is cooled and stirred and the addition of 74.1 g. of acrylonitrile is begun at 16° C. By cooling, the temperature of the reaction is maintained at between 20° and 30° C. for a period of 1 hour and 45 minutes during which time the acrylonitrile addition is completed. After all the acrylonitrile has been added, stirring is continued for 1 hour and 15 minutes at 25° C., then the reaction mixture is allowed to stand at room temperature overnight. The next morning 100 ml. of ether is added to dissolve the reaction mixture. The ether solution is then washed several times, first with 50 ml. of 5% sodium hydroxide, then with 50 ml. of saturated sodium chloride solution, next with 50 ml. of 5% hydrochloric acid and finally with 50 ml. of saturated sodium chloride solution. The ether solution is then dried by filtering through anhydrous magnesium sulfate and the ether evaporated under water pump vacuum to 50° C./15 mm. of Hg. The residue crude product after the removal of the ether distilled at high vacuum of less than 0.5 mm. of Hg to recover in high yield a relatively pure fraction of 3-(4-chlorophenylthio)propionitrile.

In the next step of the preparation 65.8 g. of the 3-(4-chlorophenylthio)propionitrile prepared as described in the previous paragraph is added to a reaction flask in 50 ml. of dichloromethane. Then very slowly to the reaction flask is added over a period of 6 hours and 15 minutes, 42.6 g. of $SO_2Cl_2$ in 50 ml. of dichloromethane. The reaction mixture is stirred during the sulfuryl chloride addition. After the completion of the addition of the sulfuryl chloride the stirred is turned off and the reaction mixture is allowed to stand overnight isolated from the atmosphere by a drying tube. The next morning the solvent and any unreacted sulfuryl chloride is stripped from the reaction mixture under reduced pressure to a pot temperature of 26° C./30 mm. of Hg, giving a crude intermediate product of α-chloro-β-cyanoethyl p-chlorophenyl sulfide.

The last major step in the preparation of the desired sulfone product is the oxidation step. To a reaction flask is added 12.6 g. of chromic oxide in 75 ml. of glacial acetic acid. With stirring and cooling as necessary to maintain the temperature at about room temperature over a period of 2 hours and 30 minutes, 11.6 g. of α-chloro-β-cyanoethyl 4-chlorophenyl sulfide dissolved in 32 ml. of glacial acetic acid and prepared as described in the immediately preceding paragraph is added to the chromium oxide and acetic acid. Stirring of the reaction mixture is continued overnight, isolating the reaction mixture from the atmosphere with a drying tube. The next morning over a period of about 5 minutes the reaction mixture is warmed to 65° C. and then poured onto 300 g. of ice with stirring. The reaction mixture is then neutralized with 50 g. of solid sodium carbonate over a period of ½ hour, adding more ice as necessary to keep the temperature down and the aqueous layer is decanted from the organic product. The crude organic product is washed with ice water and the solid product recrystallized from absolute alcohol. Recrystallization from absolute ethanol is used to further purify the crystalline product which is the desired α-chloro-β-cyanoethyl 4-chlorophenyl sulfone. The sulfone product when treated with triethyl amine dehydrochlorinates to give 3-(4-chlorophenylsulfonyl)acrylonitrile.

When the same molar amount of pentachlorobenzenethiol is used in place of the p-chlorobenzenethiol of Example 2, the resultant product is α-chloro-β-cyanoethyl pentachlorophenyl sulfone

Example 3

The bacteriostatic and fungistatic properties of the sulfones of the present invention are illustrated by the testing of α-chloro-β-cyanoethyl phenyl sulfone, the product of Example 1. This compound was mixed in predetermined concentration with hot, sterile agar which was subsequently poured into Petri dishes, cooled and allowed to harden. Neutrient agar containing the test compound was then inoculated with the bacteria *Staphylococcus aureus* and *Salmonella typhosa*, and Sabouraud's dextrose agar containing the test compound was inoculated with the fungus organism *Aspergillus niger*. The bacteria were incubated for two days at 37° C. and the fungus at 25° C. for 5 days.

The results of these bacteriostatic and fungistatic tests are reported in the table below.

| Organism: | Minimum toxicant concentration to inhibit organism growth, p.p.m. |
|---|---|
| *Staphylococcus aureus* | 1 |
| *Salmonella typhosa* | 1 |
| *Aspergillus niger* | 10 |

The other sulfones of the present invention such as α-chloro-β-cyanoethyl p-chlorophenyl sulfone, α-chloro-β-cyanoethyl pentachlorophenyl sulfone, the α-chloro-β-cyanoethyl tolyl sulfones, the α-chloro-β-cyanoethyl xylyl sulfones etc. have to a degree more or less bacteriostatic and fungistatic activity than the α-chloro-β-cyanoethyl phenyl sulfone. Thus it is seen that the sulfones of the present invention are potent bacteriostats and fungistats.

Usually these novel compounds will be applied as bacteriostats and/or fungistats at concentrations in the range of 0.0001% to 1.0% preferably 0.001% to 0.1%, suspended, dispersed or dissolved in inert carrier. Suitable compounding of the compounds of the invention is discussed in detail hereinbelow. The sulfone products of the present invention are effective in extremely dilute concentrations and for most applications it is preferred to incorporate them in a carrier or diluent. In these compositions the carrier or diluent will be the major ingredient, and the sulfones of the invention and other materials in the composition will be present in minor amounts totalling less than 50% by weight. The choice of the diluent is determined by the use of the composition as is the concentration of the active ingredient in the diluent. Thus by admixture with an inert pulverulent carrier such as talc, bentonite, kieselguhr, diatomaceous earth, etc., there can be prepared suitable compositions for application. Solutions or suspensions of the sulfones in solvents, for example, water, kerosene, alcohols, acetone or other organic solvents can be made to facilitate the application thereof. Suitable emulsifying agents for suspending the active sulfone ingredients of the invention in solvents, especially water, include, for example, alkylbenzenesulfonates, polyalkylene glycols, salts of sulfated long-chain alcohols, sorbitan fatty acid esters, etc.; other emulsifying agents which can be used to formulate emulsions of the present compounds are listed in U.S. Department of Agriculture Bulletin E607.

Example 4

This example describes the soil fungicidal testing of the product of Example 1 as illustrative of the soil fungicidal activity of the sulfones of the present invention. In this test the two pathogens are *Pythium ultimum* and *Rhizoctonia solani*, and each fungus is tested in its own separate portion of soil. Chemicals to be tested are drenched at 100 and 30 parts per million (on a soil weight basis) over the surface of the soil in the portion cups. The stock solution of the chemical is made up as follows: Three hundred mg. of the product of Example 1 is dissolved in 30 ml. of acetone or water to make up a 1% solution. Three drops of "Tween 20" are added as an emulsifier to each 30 ml. of acetone solution. The stock solution is then diluted with water to the proper concentration for use. The fungicidal activity of the test compound is based on the degree of inhibition of mycelial growth on the surface of the soil. The amount of mycelial growth on the surface of the soil is rated 1 through 5 as follows:

1=no growth,
2=growth from cornmeal only,
3=some growth in soil away from cornmeal particles,
4=surface covered but little aerial growth, and
5=surface covered, much aerial growth (growth equivalent to that on untreated soil).

Three liters of soil sterilized for three hours at 15 p.s.i. are blended with 1 liter of cornmeal-sand culture (two weeks old) of either the fungi *R. solani* or *P. ultimum*. In the chemical treatment of this fungus infested soil, 4 ml. of the solution of the chemical either at 100 p.p.m. or 30 p.p.m. concentration are drenched over this surface of the soil in the portion cups, care being taken to get the chemical evenly distributed over the surface of the soil. The treated soil is then incubated 44 hours at 70° F. in a 100% humidity chamber after being placed in 2" x 9" x 12" bread pans. The pans holding the Pythium soil were wrapped in damp towels before being placed in the incubator. An untreated check is always placed in each pan of cups.

The results of this test using the product of Example 1 are set forth in the table below.

| Fungi | Ratings (Chemical Concentrations, p.p.m.) | |
|---|---|---|
|  | 100 | 30 |
| *Pythium ultimum* | 2 | 2 |
| *Rhizoctonia solani* | 1 | 2 |

It is seen from an examination of the data in the table above that the compound α-chloro-β-cyanoethyl phenyl sulfone is quite active as a soil fungicide. In like manner and to a degree the other sulfones of the invention are more or less active; however, as soil fungicides the most active compounds are those such as the product of Example 1, the α-chloro-β-cyanoethyl tolyl sulfones, the α-chloro-β-cyanoethyl xylyl sulfones and the like. A compound such as the product of Example 2 containing aromatic chlorine substituents are in general not as active as soil fungicides although being very active as fungistats and bacteriostats, as the compound not containing aromatic chlorine substituents.

The new compounds of the invention are also useful for foliage application to kill or suppress the growth of undesirable microorganisms harmful to plants. For example, the product of Example 1 was applied to tomato plants for the control of early and late blight with the following results:

| Microorganism | Applied Conc. of Chemical, p.p.m. | Disease Incidence |
|---|---|---|
| *Alternaria solani* (early blight) | 300 | 2 |
| *Alternaria solani* (early blight) | 100 | 3 |
| *Phytophthora infestans* (late blight) | 300 | 1 |
| *Phytophthora infestans* (late blight) | 100 | 2 |

Disease incidence is rated numerically 1-5 with 1 indicating no disease and 5 indicating severe disease. Thus it is seen that the compound of Example 1 gives very good control of both early and late tomato blight.

In commercial use these soil fungicides of the invention are applied to the soil in concentrations in the range of about 2 to about 200 lbs./acre, preferably in the range of about 5 to about 100 lbs./acre, depending on the activity of the particular sulfone used, the nature of the soil, how badly the soil is infected with fungi, the particular types of fungi to be suppressed or destroyed, etc. The soil fungicides can be applied to the soil in dilute concentration as described above and mixed into the soil by plowing, disking, harrowing, or other type of cultivation, or at the time of seeding. Application of the chemical to the soil can be prior to or concurrently with the cultivating or seeding operations by apparatus well known and commercially available for this type of treatment. Alternatively the soil can be treated by planting seeds treated with the chemical, but the direct soil treatment rather than seed treatment would appear to be more effective.

Although the invention has been described in terms of specified embodiments which are set forth in considerable detail, it should be understood that this is by way of illustration only, and that the invention is not necessarily limited thereto, since alternative embodiments will become apparent to those skilled in the art in view of the disclosure. Accordingly, modifications are contemplated which can be made without departing from the spirit of the described invention.

What is claimed is:
1. An α-chloro-β-cyanoethyl aryl sulfone of the formula

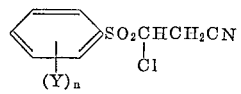

wherein Y is selected from the class consisting of halogen atoms and alkyl radicals having from 1 to 6 carbon atoms, and $n$ is an integer from 0 to 5.

2. An α-chloro-β-cyanoethyl aryl sulfone of the formula

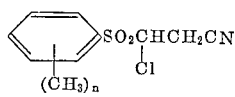

wherein $n$ is an integer from 0 to 2,

3. α-Chloro-β-cyanoethyl phenyl sulfone.
4. α-Chloro-β-cyanoethyl tolyl sulfone.
5. An α-chloro-β-cyanoethyl aryl sulfone of the formula

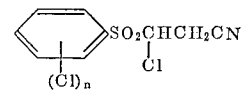

wherein $n$ is an integer from 1 to 5.
6. α-Chloro-β-cyanoethyl p-chlorophenyl sulfone.
7. α-Chloro-β-cyanoethyl pentachlorophenyl sulfone.
8. A biological toxicant composition comprising an inert carrier and as the essential effective ingredient, a pesticidally effective amount of an α-chloro-β-cyanoethyl aryl sulfone of the formula

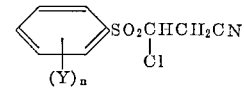

wherein Y is selected from the class consisting of halogen atoms and alkyl radicals having from 1 to 6 carbon atoms, and $n$ is an integer from 0 to 5.

9. A method of inhibiting the growth of undesired microorganisms which comprises exposing said microorganisms of a toxic amount of an α-chloro-β-cyanoethyl aryl sulfone of the formula

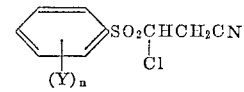

wherein Y is selected from the class consisting of halogen atoms and alkyl radicals having from 1 to 6 carbon atoms, and $n$ is an integer from 0 to 5.

10. A method of inhibiting the growth of undesired microorganisms which comprises exposing said microorganisms to a toxic amount of a compound of the formula

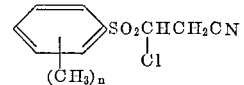

wherein $n$ is an integer of from 0 to 2.

11. A method of inhibiting the growth of undesired microorganisms which comprises exposing said microorganisms to a toxic amount of α-chloro-β-cyanoethyl phenyl sulfone.

12. A method of inhibiting the growth of undesired microorganisms which comprises exposing said microorganisms to a toxic amount of α-chloro-β-cyanoethyl tolyl sulfone.

13. A method of inhibiting the growth of undesired microorganisms which comprises exposing said microorganisms to a toxic amount of an α-chloro-β-cyanoethyl aryl sulfone of the formula

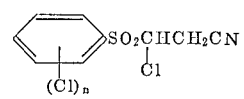

wherein $n$ is an integer of from 1 to 5.

14. A method of inhibiting the growth of undesired microorganisms which comprises exposing said microorganisms to a toxic amount of α-chloro-β-cyanoethyl p-chlorophenyl sulfone.

15. A method of inhibiting the growth of undesired microorganisms which comprises exposing said microorganisms to a toxic amount of α-chloro-β-cyanoethyl pentachlorophenyl sulfone.

16. A method comprising treating soil with a sufficient amount to inhibit fungal growth of an α-chloro-β-cyanoethyl aryl sulfone of the formula

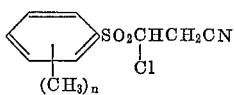

wherein $n$ is an integer from 0 to 2.

17. A method comprising treating soil with a sufficient amount to inhibit fungal growth of α-chloro-β-cyanoethyl phenyl sulfone.

18. A method comprising treating soil with a sufficient amount to inhibit fungal growth of α-chloro-β-cyanoethyl tolyl sulfone.

19. A composition comprising soil and an amount sufficient to inhibit the growth of fungi of an α-chloro-β-cyanoethyl aryl sulfone of the formula

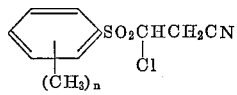

wherein $n$ is an integer of from 0 to 2.

References Cited in the file of this patent
FOREIGN PATENTS
230,870    Australia _____ Oct. 5, 1960